Nov. 7, 1933.    J. K. HODNETTE    1,934,501
CORE TYPE TRANSFORMER
Filed Feb. 23, 1933    2 Sheets-Sheet 1
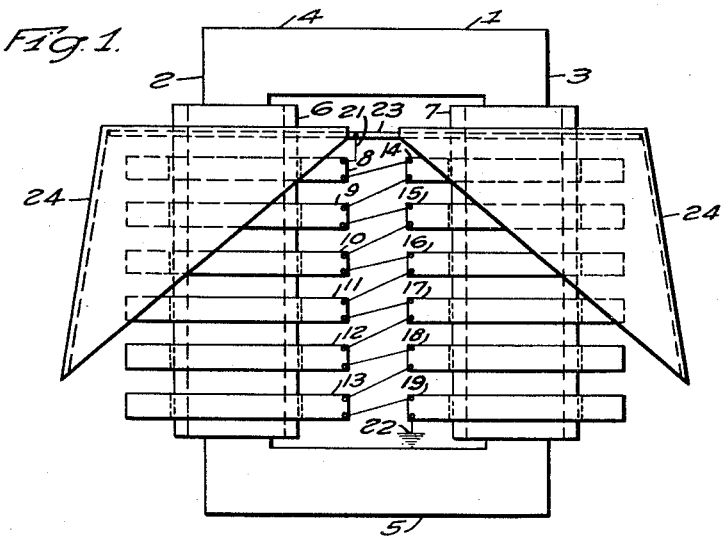
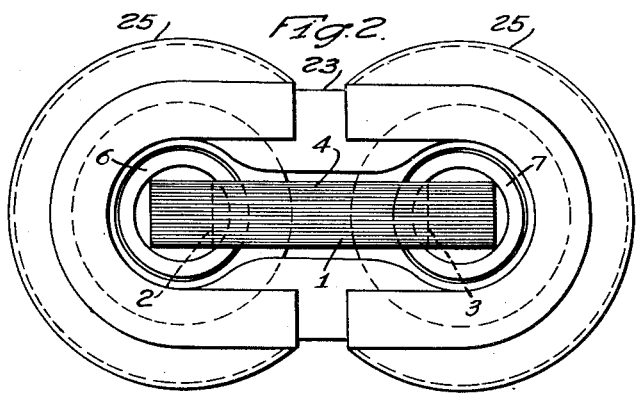
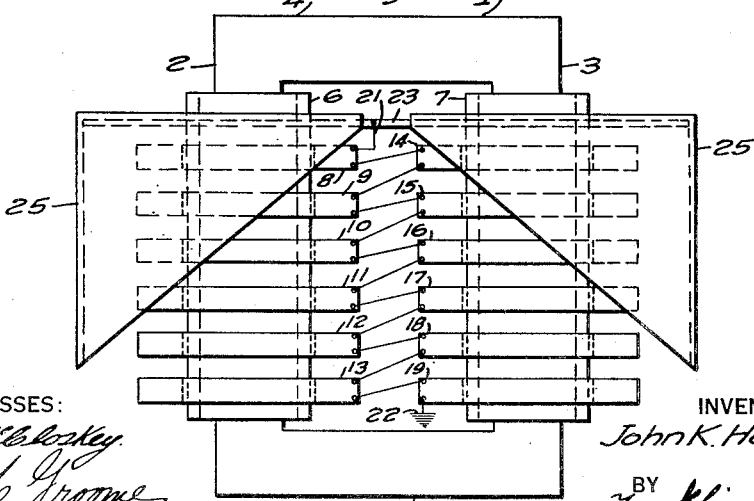
WITNESSES:
E. A. McCloskey
Oliver C. Groome
INVENTOR
John K. Hodnette.
BY Franklin E. Hardy
ATTORNEY Nov. 7, 1933.  J. K. HODNETTE  1,934,501
CORE TYPE TRANSFORMER
Filed Feb. 23, 1933   2 Sheets-Sheet 2
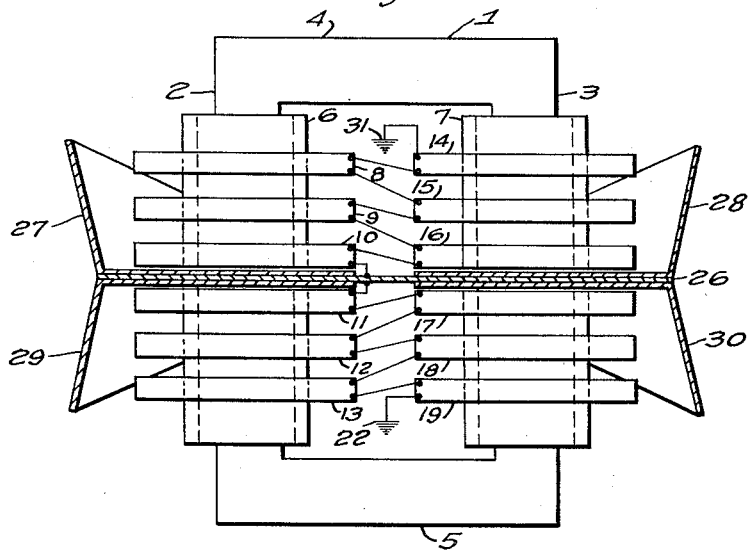
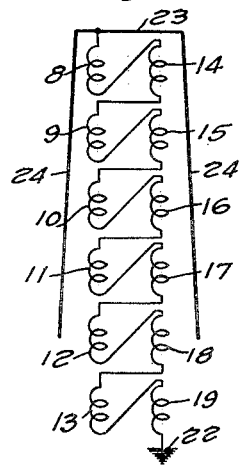
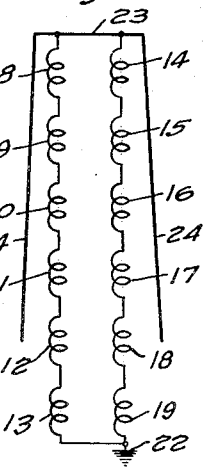
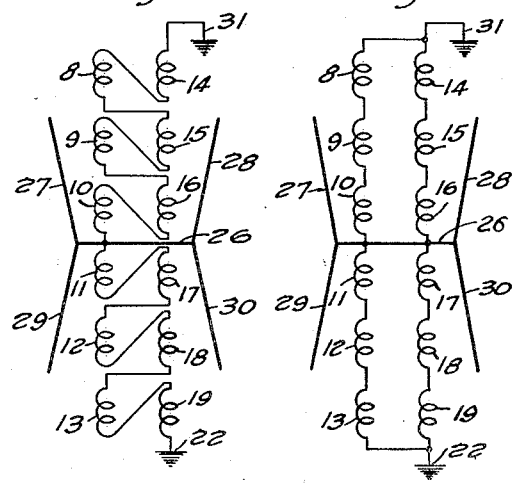
INVENTOR
John K. Hodnette.
BY
Franklin E. Hardy
ATTORNEY Patented Nov. 7, 1933

1,934,501

UNITED STATES PATENT OFFICE 1,934,501

CORE TYPE TRANSFORMER

John K. Hodnette, Sharon, Pa., assignor to Westinghouse Electric & Manufacturing Company, East Pittsburgh, Pa., a corporation of Pennsylvania Application February 23, 1933. Serial No. 657,967

9 Claims. (Cl. 175—356)

My invention relates to methods of and means for improving the electrostatic distribution of surge voltages in the windings of electrical apparatus.

In the windings of electrical apparatus, such as transformers, that are connected to a transmission line, the voltage between the terminals of a winding varies uniformly from one end of the winding to the other under normal frequency and voltage conditions of the system. However, during certain conditions of the system, such as may be caused by lightning or by switching operations on the transmission line, a high voltage surge may occur on the transmission line and into the winding of the transformer.

In windings of the usual construction, a voltage surge will not initially distribute itself along the winding in a manner to establish a uniform voltage gradient thereon, but its initial distribution produces a high concentration of voltage stress on parts of the winding connected near the line terminal. This initial voltage gradient results from the values of the electrostatic conditions existing between the winding and ground and between different portions of the winding, such as between different winding turns or groups of turns.

Because of the inductance and distributed capacitance of the winding, a redistribution of the energy takes place causing oscillations of the voltage values therein about the value corresponding to its final or uniform distributed value. The amplitude of the oscillations will initially correspond to the difference between the initial voltage and the final voltage distribution along the winding. These oscillations create successive voltage stresses between adjacent parts of the winding and between the winding and ground.

The problem of insulating the conductors and coils of a transformer winding to withstand the surge voltages impressed upon them is a difficult one because, in the usual construction of these parts, the conductors are so small that satisfactory means of applying sufficient insulation to withstand the voltage stresses are not readily available and if sufficient insulating material is applied about the conductor, the space factor between the conductors becomes so large as to adversely affect the efficiency of the design. It is, therefore, desirable to provide means for lessening the voltage stress between the several parts of the winding that are caused by the concentration of surge voltages in order to produce satisfactory operation of the apparatus.

The general object of my invention is to provide for protecting the winding of an electrical apparatus from the transient voltage distribution effect of a high-voltage surge.

Another object of my invention is to provide, in an electrical apparatus comprising a plurality of winding coils, for relieving the static stress and thereby to substantially neutralize the capacitance current from the winding to ground upon the occurrence of a rapid change in voltage across the electrical apparatus.

Other objects of my invention will appear from the following description taken in connection with the accompanying drawings, in which Figure 1 is a view of a transformer in side elevation constructed in accordance with one embodiment of my invention.

Fig. 2 is a plan view of the transformer illustrated in Fig. 3.

Fig. 3 is a view of a transformer in side elevation illustrating a modification of the structure shown in Fig. 1.

Fig. 4 is a view mainly in side elevation illustrating another embodiment of my invention, and Figs. 5, 6, 7 and 8 are explanatory diagrams showing different arrangements of the winding circuit.

Referring to the drawings, and particularly to Figs. 1 and 2 thereof, a core 1 is provided comprising two vertical winding legs 2 and 3, connected at the top and bottom respectively, by the yoke portions 4 and 5 forming a rectangular structure of magnetic material about a central opening or window. Low-voltage windings 6 and 7 are positioned respectively about the winding legs 2 and 3 and are, in turn, enclosed within high-voltage windings comprising a column of coils 8, 9, 10, 11, 12 and 13 about the low-voltage winding 6 and a column of coils 14, 15, 16, 17, 18 and 19 about the low voltage winding 7. The high-voltage winding coils are connected between a high-voltage terminal 21 and a grounded terminal 22 by proper connections between the coil terminals which, as illustrated, are provided on the sides of the coils that are positioned relatively near to the coils of the other coil stack, thus providing a short connecting path between a coil on one winding leg of the core and a coil on the other winding leg of the core. As will be seen by reference to Fig. 1 of the drawings, coils having the same elevation in the two coil columns are connected next to one another in the winding circuit. That is to say, the coil 8 which is the highest voltage coil of the column about the winding leg 2 is connected to the coil 14 which is the highest voltage coil in the column of coils about the winding leg 3, and, the second coils of each column, namely, 9 and 15 are connected together, as are also the similarly positioned coils 10 and 16, 11 and 17, 12 and 18, and 13 and 19.

In order to protect the high-voltage winding coils from the effect of a sudden change in voltage across the winding, an electrostatic plate having a flat portion 23 is provided adjacent the high-voltage terminal 21 and connected to the high-voltage winding comprising the column of coils above described. The flat portion 23 of the electrostatic plate extends around both winding legs 2 and 3 of the core and the low-voltage windings 6 and 7 of the transformer, and covers the ends of the high-voltage winding, except for an opening under the yoke of the core to prevent forming a short circuited turn around the core. This electrostatic plate is connected to the line terminal in order that it may be charged to a voltage sufficiently high to provide the charging current to ground, thus eliminating the capacity to ground from the high-voltage end of the columns of coils, and thereby neutralizing the flow of charging current to ground at the end of the column of high-voltage coils.

The electrostatic plate, in addition to the horizontal portion 23 thereof, that is connected to the high voltage terminal of the winding, also comprises side portions 24 which extend from the portion 23 about the columns of coils on the two winding legs. The upper ends of the side portions 24 are made parallel to and contact with the surface of the horizontal portion 23, and extend downwardly along the sides of the coil columns, being spaced therefrom and of decreasing dimensions, or area, as the distance from the high voltage end of the winding increases. The side portions of the electrostatic plate extending along the sides of the coil column may be made either conical or cylindrical in shape as illustrated, respectively, by the wings 24 and 25 in Figs. 1 and 3. The surface and spacing of the side portions of the electrostatic plate exposed to the column of coils is so proportioned as supply a charging current to the coil column that is equal to the charging current between the coils and ground, or to the core. The area of the side portions of the plate is decreased as its distance from the line, or high-voltage end, of the winding is increased, or, as the voltage between the coils and the plate increases.

The side portions of the electrostatic plate are so shaped and positioned as to extend along the coil column on the sides thereof opposite the terminals of the coils, that is, opposite to the portions of the coils that are within the window of the core structure. This arrangement provides for sloping the edges of the side portions of the electrostatic plate downwardly about the center line of the transformer downwardly about the coil columns, thus permitting access to the coils for changing the circuit connections therebetween.

The arrangement of the electrostatic plate about the columns provides for circulation of the oil between the high-voltage and low-voltage coils, and through the high voltage coils, upwardly through the opening in the electrostatic plate provided for slipping it down over the yoke of the core, that is to say, upwardly through the space within the window of the core. The electrostatic plate may be perforated at or near the top to provide additional passages for oil circulation.

Several arrangements of the high voltage winding circuit and of the electrostatic plate may be made, one modification of which is shown in Fig. 4. In Fig. 4, the terminal of the high-voltage winding circuit is connected to the central portion of the coil columns and to an electrostatic plate 26 that is similar in shape to the plate 23 of Fig. 1 and is provided with side wings or plates 27, 28, 29 and 30 extending along the several groups of coil columns from the high voltage end toward the low voltage ends thereof. The high voltage winding, therefore, comprises two parallel paths from the plate portion 26 to the grounded terminals 22 and 31, respectively. The side portions of the electrostatic plate 27, 28, 29 and 30 are shaped, in general, similarly to the portions 24 of Fig. 1, that is, to provide a decreasing area along the columns to thereby supply a decreasing capacity current sufficient to neutralize the normal flow of capacity current from the coils of the high-voltage winding to the low-voltage winding and ground.

Figs. 5, 6, 7 and 8 are explanatory diagrams illustrating different arrangements of the electrostatic plate and the coils of the high-voltage winding. Fig. 5 illustrates schematically the arrangement described in Fig. 1 of the drawings and Fig. 7 illustrates schematically the arrangement shown in Fig. 4 of the drawings. Fig. 6 illustrates schematically the electrostatic plate construction illustrated in Fig. 1, with the high voltage winding arranged in two parallel paths, each path being through the column of coils on one winding leg.

Fig. 8 illustrates schematically the structural arrangement shown in Fig. 4 having two groups on each winding leg connected in series between the electrostatic plate and ground, thus providing four parallel paths between the high-voltage terminal and ground.

The arrangement of the electrostatic plates illustrated and described is very simple to construct, and is effective in neutralizing the flow of capacity current to ground from the high voltage winding coils without being so positioned as to restrict the flow of cooling oil upwardly through the winding. Thus ample cooling of the transformer windings is insured. The electrostatic plate is so arranged about the winding columns as to provide ready access to the coil terminals for changing tap connections between the coils. Since also the side portions of the plate that extend along the coil columns, are separable from the horizontal portion, they may be readily removed when inspection of the coils is desired.

Many modifications may be made in the apparatus illustrated and described without departing from the spirit of my invention, and I do not wish to be limited other than by the scope of the appended claims.

I claim as my invention:

1. Electrical induction apparatus comprising a core member having two winding legs, windings on said winding legs, and means for producing a substantially uniform dielectric field throughout the length of said winding comprising an electrostatic plate covering one end of both windings and having portions of decreasing dimensions extending along said windings on the sides thereof most remote from the other winding.

2. Electrical induction apparatus comprising two columns of windings connected between a high-voltage terminal and ground, and means for protecting said windings from the effect of surge voltages comprising an electrostatic plate covering the high-voltage end of both windings and provided with portions of decreasing dimensions extending along beside each winding on the side thereof most remote from the other winding.

3. Electrical induction apparatus comprising a substantially rectangular core member having two winding legs, a winding about each core leg, said windings being connected between a high-voltage terminal and ground, and means for protecting said windings from the effect of surge voltages comprising an electrostatic plate forming a continuous conducting path extending around both winding legs and substantially covering the high-voltage ends of the windings, and having a portion of decreasing dimensions extending along each winding on the side thereof, remote from the other winding.

4. Electrical induction apparatus comprising a core member having two winding legs, a plurality of coils about each of said winding legs connected to provide a high-voltage winding circuit between a high-voltage terminal and ground, and means for protecting said coils from the effect of surge voltages comprising an electrostatic plate shaped and positioned to provide a continuous conducting path encircling both winding legs adjacent the high-voltage end of said winding circuit and connected thereto.

5. Electrical induction apparatus comprising a core member having two winding legs, a plurality of coils about each of said winding legs connected to provide a high-voltage winding circuit between a high-voltage terminal and ground, and means for protecting said coils from the effect of surge voltages comprising an electrostatic plate shaped and positioned to provide a continuous conducting path encircling both winding legs adjacent the high-voltage end of said winding circuit and connected thereto, said plate having portions extending along said coils adjacent the side thereof that is most removed from the winding legs.

6. Electrical induction apparatus comprising a core member having two winding legs, a plurality of coils about each of said winding legs connected to provide a high-voltage winding circuit between a high voltage terminal and ground, and means for protecting said coils from the effect of surge voltages comprising an electrostatic plate shaped and positioned to provide a continuous conducting path encircling both winding legs adjacent the high-voltage end of said winding circuit and connected thereto, said plate having portions extending along said coils adjacent the side thereof that is most remote from the winding legs, the connections between said coils being made on the sides thereof adjacent the coils on the other coil leg.

7. Electrical induction apparatus comprising a core member having two winding legs, a plurality of coils about each of said winding legs connected to provide a high-voltage winding circuit between a high-voltage terminal and ground, and means for protecting said coils from the effect of surge voltages comprising an electrostatic plate shaped and positioned to provide a continuous conducting path encircling both winding legs adjacent the high-voltage end of said winding circuit and connected thereto, said electrostatic plate having detachable portions connected thereto and extending adjacent said coils and having decreasing dimensions as the distance from the high-voltage end increases.

8. Electrical induction apparatus comprising a core member forming a window and having two winding legs, a column of coils about each of said winding legs extending through said window and provided with coil connecting terminals on the sides thereof adjacent said core window for connecting said coils to provide a winding circuit between a high-voltage terminal and ground, and means for substantially preventing the flow of charging current from said coils to ground comprising an electrostatic plate about said core adjacent the high-voltage end of the winding circuit and connected to said high-voltage terminal.

9. Electrical induction apparatus comprising a core member forming a window and having two winding legs, a column of coils about each of said winding legs extending through said window and provided with coil connecting terminals on the sides thereof adjacent said core window for connecting said coils to provide a winding circuit between a high-voltage terminal and ground, and means for substantially preventing the flow of charging current from said coils to ground comprising an electrostatic plate about said core adjacent the high-voltage end of the winding circuit and connected to said high-voltage terminal, said electrostatic plate having detachable portions extending therefrom along the sides of said column of coils outside of said core window and decreasing in dimensions as the distance from the high-voltage end of the winding increases.

JOHN K. HODNETTE.